US010012745B2

(12) United States Patent
Krebs et al.

(10) Patent No.: US 10,012,745 B2
(45) Date of Patent: Jul. 3, 2018

(54) ORTHOGONAL SOURCE AND RECEIVER ENCODING

(71) Applicants: Jerome R. Krebs, Houston, TX (US);
Young Ho Cha, Houston, TX (US);
Sunwoong Lee, Houston, TX (US);
Pavel Dimitrov, Houston, TX (US);
Anoop A. Mullur, Houston, TX (US);
Nathan J. Downey, Houston, TX (US);
Partha S. Routh, Katy, TX (US)

(72) Inventors: Jerome R. Krebs, Houston, TX (US);
Young Ho Cha, Houston, TX (US);
Sunwoong Lee, Houston, TX (US);
Pavel Dimitrov, Houston, TX (US);
Anoop A. Mullur, Houston, TX (US);
Nathan J. Downey, Houston, TX (US);
Partha S. Routh, Katy, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 1145 days.

(21) Appl. No.: 13/748,121

(22) Filed: Jan. 23, 2013

(65) Prior Publication Data
US 2013/0238246 A1 Sep. 12, 2013

Related U.S. Application Data

(60) Provisional application No. 61/608,435, filed on Mar. 8, 2012, provisional application No. 61/726,319, filed on Nov. 14, 2012.

(51) Int. Cl.
G01V 9/00 (2006.01)
G06F 17/00 (2006.01)
(Continued)

(52) U.S. Cl.
CPC .............. *G01V 1/003* (2013.01); *G01V 1/005* (2013.01); *G01V 1/28* (2013.01); *G01V 9/00* (2013.01);
(Continued)

(58) Field of Classification Search
CPC ...................................................... G01V 1/28
See application file for complete search history.

(56) References Cited

U.S. PATENT DOCUMENTS 3,705,382 A * 12/1972 Quay ..................... G01V 1/366
367/24
3,812,457 A 5/1974 Weller
(Continued)

FOREIGN PATENT DOCUMENTS

EP 1 094 338 4/2001
EP 1 746 443 1/2007
(Continued)

OTHER PUBLICATIONS

Applicant's response dated Aug. 5, 2013 in the corresponding PCT/US2013/22723 filed Jan. 23, 2013.*
(Continued)

*Primary Examiner* — Paul D Lee
*Assistant Examiner* — Mark Crohn
(74) *Attorney, Agent, or Firm* — ExxonMobil Upstream Research Company Law Department

(57) ABSTRACT

Method for performing simultaneous encoded-source inversion of geophysical data to estimate parameters of a physical property model (41), especially adapted for surveys without fixed-receiver acquisition geometry, such as marine seismic surveys with moving source and receivers. The encoding functions (32) used on the sources to generate one or more simultaneous encoded-source gathers of data (35), as well as to simulate the same (34), are orthogonal or pseudo-orthogo-
(Continued)

nal with respect to cross-correlation. In addition, receivers are also encoded, with the receiver encoding being designed to make a given receiver less sensitive to sources to which it was not listening during the survey (38). The encoding functions may be temporal bandpass filters differing one from another by central frequency, phase, or both. Efficiency of the method may be further improved by grouping several sources into a super-source, grouping the corresponding gathers into a super-gather, and then applying the above encoding strategy.

18 Claims, 3 Drawing Sheets

(51) Int. Cl.
 *G01V 1/00* (2006.01)
 *G01V 1/28* (2006.01)
(52) U.S. Cl.
 CPC .......... *G06F 17/00* (2013.01); *G01V 2210/66* (2013.01)

(56) References Cited

U.S. PATENT DOCUMENTS

| | | | |
|---|---|---|---|
| 3,864,667 A | 2/1975 | Bahjat |
| 4,159,463 A | 6/1979 | Silverman |
| 4,168,485 A | 9/1979 | Payton et al. |
| 4,545,039 A | 10/1985 | Savit |
| 4,562,650 A | 1/1986 | Nagasawa et al. |
| 4,575,830 A | 3/1986 | Ingram et al. |
| 4,594,662 A | 6/1986 | Devaney |
| 4,633,447 A | 12/1986 | Bodine |
| 4,636,957 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,173,879 A | 12/1992 | Cung et al. |
| 5,260,911 A | 11/1993 | Mason et al. |
| 5,469,062 A | 11/1995 | Meyer, Jr. |
| 5,545,858 A | 8/1996 | Sansone |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,027,927 B2 | 7/2006 | Routh et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 8,121,823 B2 | 2/2012 | Krebs et al. |
| 8,223,587 B2 | 7/2012 | Krebs et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |

(56) References Cited

U.S. PATENT DOCUMENTS

| | | |
|---|---|---|
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs, Jr. et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs, Jr. et al. |
| 2011/0040926 A1 | 2/2011 | Donderici et al. |
| 2011/0051553 A1 | 3/2011 | Scott et al. |
| 2011/0090760 A1 | 4/2011 | Rickett et al. |
| 2011/0120724 A1 | 5/2011 | Krohn |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0276320 A1 | 11/2011 | Krebs et al. |
| 2011/0288831 A1 | 11/2011 | Tan et al. |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2013/0242696 A1* | 9/2013 | van Groenestijn .... G01V 1/364 367/24 |

FOREIGN PATENT DOCUMENTS

| | | |
|---|---|---|
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2011/040926 | 4/2011 |
| WO | WO 2011/091216 | 7/2011 |
| WO | WO 2011/093945 | 8/2011 |

OTHER PUBLICATIONS

Jerome R. Krebs, John E. Anderson, David Hinkley, Ramesh Neelamani, Sunwoong Lee, Anatoly Baumstein, and Martin-Daniel Lacasse, "Full-wavefield seismic inversion using encoded sources," Geophysics 74-6, WCC177-WCC188 (2009).*

Griewank, A. (2000), Evaluating Derivatives: Principles and Techniques of Algorithmic Differentiation, Society for Industrial and Applied Mathematics, 49 pgs.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical Software* 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf.

Helbig, K. (1994), "Foundations of Anisotropy for Exploration Seismics," Chapter 5, pp. 185-194.

Herrmann, F.J. (2010), "Randomized dimensionality reduction for full-waveform inversion," *EAGE abstract* G001, EAGE Barcelona meeting, 5 pgs.

Holschneider, J. et al. (2005), "Characterization of dispersive surface waves using continuous wavelet transforms," *Geophys. J. Int.* 163, pp. 463-478.

Hu, L.Z. et al. (1987), "Wave-field transformations of vertical seismic profiles," *Geophysics* 52, pp. 307-321.

Huang, Y. et al. (2012), "Multisource least-squares migration of marine streamer and land data with frequency-division encoding," *Geophysical Prospecting* 60, pp. 663-680.

Igel, H. et al. (1996), "Waveform inversion of marine reflection seismograms for P impedance and Poisson's ratio," *Geophys. J. Int.* 124, pp. 363-371.

Ikelle, L.T. (2007), "Coding and decoding: Seismic data modeling, acquisition, and processing," 77th Annual Int'l. Meeting, SEG Expanded Abstracts, pp. 66-70.

Jackson, D.R. et al. (1991), "Phase conjugation in underwater acoustics," *J. Acoust. Soc. Am.* 89(1), pp. 171-181.

Jing, X. et al. (2000), "Encoding multiple shot gathers in prestack migration," *SEG International Exposition and 70$^{th}$ Annual Meeting Expanded Abstracts*, pp. 786-789.

Kennett, B.L.N. (1991), "The removal of free surface interactions from three-component seismograms", *Geophys. J. Int.* 104, pp. 153-163.

Krebs, J.R. (2008), "Fast Full-wavefield seismic inversion using encoded sources," *Geophysics* 74(6), pp. WCC177-WCC188.

Krohn, C.E. (1984), "Geophone ground coupling," *Geophysics* 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pgs.

Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.

Lancaster, S. et al. (2000), "Fast-track 'colored' inversion," 70$^{th}$ SEG Ann. Meeting, *Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

Lazaratos, S. (2006), "Spectral Shaping Inversion for Elastic and Rock Property Estimation," *Research Disclosure*, Issue 511, pp. 1453-1459.

Lazaratos, S. et al. (2011), "Improving the convergence rate of full wavefield inversion using spectral shaping," *SEG Expanded Abstracts* 30, pp. 2428-2432.

Lecomte, I. (2008), "Resolution and illumination analyses in PSDM: A ray-based approach," The Leading Edge, pp. 650-663.

(56) References Cited

OTHER PUBLICATIONS

Lee, S. et al. (2010), "Subsurface parameter estimation in full wavefield inversion and reverse time migration," SEG Denver 2010 Annual Meeting, pp. 1065-1069.
Levanon, N. (1988), "Radar Principles," Chpt. 1, John Whiley & Sons, New York, pp. 1-18.
Liao, Q. et al. (1995), "2.5D full-wavefield viscoacoustic inversion," *Geophysical Prospecting* 43, pp. 1043-1059.
Liu, F. et al. (2007), "Reverse-time migration using one-way wavefield imaging condition," *SEG Expanded Abstracts* 26, pp. 2170-2174.
Liu, F. et al. (2011), "An effective imaging condition for reverse-time migration using wavefield decomposition," *Geophysics* 76, pp. S29-S39.
Maharramov, M. et al. (2007), "Localized image-difference wave-equation tomography," SEG Annual Meeting, *Expanded Abstracts*, pp. 3009-3013.
Malmedy, V. et al. (2009), "Approximating Hessians in unconstrained optimization arising from discretized problems," *Computational Optimization and Applications*, pp. 1-16.
Marcinkovich, C. et al. (2003), "On the implementation of perfectly matched layers in a three-dimensional fourth-order velocity-stress finite difference scheme," *J. of Geophysical Research* 108(B5), 2276.
Martin, G.S. et al. (2006), "Marmousi2: An elastic upgrade for Marmousi," *The Leading Edge*, pp. 156-166.
Meier, M.A. et al. (2009), "Converted wave resolution," Geophysics, 74(2):doi:10.1190/1.3074303, pp. Q1-Q16.
Moghaddam, P.P. et al. (2010), "Randomized full-waveform inversion: a dimenstionality-reduction approach," $80^{th}$ SEG Ann. Meeting, *Expanded Abstracts*, pp. 977-982.
Mora, P. (1987), "Nonlinear two-dimensional elastic inversion of multi-offset seismic data," *Geophysics* 52, pp. 1211-1228.
Mora, P. (1987), "Elastic Wavefield Inversion," PhD Thesis, Stanford University, pp. 22-25.
Mora, P. (1989), "Inversion = migration + tomography," *Geophysics* 64, pp. 888-901.
Nazarian, S. et al. (1983), "Use of spectral analysis of surface waves method for determination of moduli and thickness of pavement systems," *Transport Res. Record* 930, pp. 38-45.
Neelamani, R., (2008), "Simultaneous sourcing without compromise," 70th Annual Int'l. Conf. and Exh., EAGE, 5 pgs.
Neelamani, R. (2009), "Efficient seismic forward modeling using simultaneous sources and sparsity," *SEG Expanded Abstracts*, pp. 2107-2111.
Nocedal, J. et al. (2006), "*Numerical Optimization, Chapt. 7—Large-Scale Unconstrained Optimization*," Springer, New York, $2^{nd}$ Edition, pp. 165-176.
Ostmo, S. et al. (2002), "Finite-difference iterative migration by linearized waveform inversion in the frequency domain," SEG Int'l. Expo. & $72^{nd}$ Ann. Meeting, 4 pgs.
Plessix, R.E. et al. (2004), "Frequency-domain finite-difference amplitude preserving migration," *Geophys. J. Int.* 157, pp. 975-987.
Park, C.B. et al. (1999), "Multichannel analysis of surface waves," *Geophysics* 64(3), pp. 800-808.
Park, C.B. et al. (2007), "Multichannel analysis of surface waves (MASW)—active and passive methods," *The Leading Edge*, pp. 60-64.
Pica, A. et al. (2005), "3D Surface-Related Multiple Modeling, Principles and Results," 2005 SEG Ann. Meeting, *SEG Expanded Abstracts* 24, pp. 2080-2083.
Porter, R.P. (1989), "Generalized holography with application to inverse scattering and inverse source problems," In E. Wolf, editor, Progress in Optics XXVII, Elsevier, pp. 317-397.
Pratt, R.G. et al. (1998), "Gauss-Newton and full Newton methods in frequency-space seismic waveform inversion," *Geophys. J. Int.* 133, pp. 341-362.
Pratt, R.G. (1999), "Seismic waveform inversion in the frequency domain, Part 1: Theory and verification in a physical scale model," *Geophysics* 64, pp. 888-901.
Rawlinson, N. et al. (2008), "A dynamic objective function technique for generating multiple solution models in seismic tomography," *Geophys. J. Int.* 178, pp. 295-308.
Rayleigh, J.W.S. (1899), "On the transmission of light through an atmosphere containing small particles in suspension, and on the origin of the blue of the sky," Phil. Mag. 47, pp. 375-384.
Romero, L.A. et al. (2000), Phase encoding of shot records in prestack migration, *Geophysics* 65, pp. 426-436.
Ryden, N. et al. (2006), "Fast simulated annealing inversion of surface waves on pavement using phase-velocity spectra," *Geophysics* 71(4), pp. R49-R58.
Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.
Schuster, G.T. et al. (2010), "Theory of Multisource Crosstalk Reduction by Phase-Encoded Statics," SEG Denver 2010 Ann. Meeting, pp. 3110-3114.
Sheen, D-H. et al. (2006), "Time domain Gauss-Newton seismic waveform inversion in elastic media," Geophysics J. Int. 167, pp. 1373-1384.
Shen, P. et al. (2003), "Differential semblance velocity analysis by wave-equation migration," $73^{rd}$ Ann. Meeting of Society of Exploration Geophysicists, 4 pgs.
Sheng, J. et al. (2006), "Early arrival waveform tomography on near-surface refraction data," *Geophysics* 71, pp. U47-U57.
Sheriff, R.E.et al. (1982), "*Exploration Seismology*", pp. 134-135.
Shih, R-C. et al. (1996), "Iterative pre-stack depth migration with velocity analysis," *Terrestrial, Atmospheric & Oceanic Sciences* 7(2), pp. 149-158.
Simard, P.Y. et al. (1990), "Vector Field Restoration by the Method of Convex Projections," *Computer Vision, Graphics and Image Processing* 52, pp. 360-385.
Shin, C. et al. (2001), "Waveform inversion using a logarithmic wavefield," *Geophysics* 49, pp. 592-606.
Sirgue, L. (2004), "Efficient waveform inversion and imaging: A strategy for selecting temporal frequencies," *Geophysics* 69, pp. 231-248.
Spitz, S. (2008), "Simultaneous source separation: a prediction-subtraction approach," 78th Annual Int'l. Meeting, *SEG Expanded Abstracts*, pp. 2811-2815.
Stefani, J. (2007), "Acquisition using simultaneous sources," 69th Annual Conf. and Exh., *EAGE Extended Abstracts*, 5 pgs.
Symes, W.W. (2007), "Reverse time migration with optimal checkpointing," *Geophysics* 72(5), pp. P.SM213-SM221.
Tang, Y. (2008), "Wave-equation Hessian by phase encoding," *SEG Expanded Abstracts* 27, pp. 2201-2205.
Tang, Y. (2009), "Target-oriented wave-equation least-squares migration/inversion with phase-encoded Hessian," *Geophysics* 74, pp. WCA95-WCA107.
Tang, Y. et al. (2010), "Preconditioning full waveform inversion with phase-encoded Hessian," *SEG Expanded Abstracts* 29, pp. 1034-1037.
Tarantola, A. (1984), "Inversion of seismic reflection data in the acoustic approximation," *Geophysics* 49, pp. 1259-1266.
Tarantola, A. (1986), "A strategy for nonlinear elastic inversion of seismic reflection data," *Geophysics* 51(10), pp. 1893-1903.
Tarantola, A. (1988), "Theoretical background for the inversion of seismic waveforms, including elasticity and attenuation," *Pure and Applied Geophysics* 128, pp. 365-399.
Tarantola, A. (2005), "Inverse Problem Theory and Methods for Model Parameter Estimation," *SIAM*, pp. 79.
Trantham, E.C. (1994), "Controlled-phase acquisition and processing," *SEG Expanded Abstracts* 13, pp. 890-894.
Tsvankin, I. (2001), "Seismic Signatures and Analysis of Reflection Data in Anisotropic Media," Elsevier Science, p. 8.
van Manen, D.J. (2005), "Making wave by time reversal," SEG International Exposition and $75^{th}$ Annual Meeting, *Expanded Abstracts*, pp. 1763-1766.
van Groenestijn, G.J.A. et al. (2009), "Estimating primaries by sparse inversion and application to near-offset reconstruction," *Geophyhsics* 74(3), pp. A23-A28.

(56) References Cited

OTHER PUBLICATIONS

Verschuur, D.J. (2009), Target-oriented, least-squares imaging of blended data, 79th Annual Int'l. Meeting, *SEG Expanded Abstracts*, pp. 2889-2893.
Verschuur, D.J. et al. (1992), "Adaptive surface-related multiple elimination," *Geophysics* 57(9), pp. 1166-1177.
Verschuur, D.J. (1989), "Wavelet Estimation by Prestack Multiple Elimination," *SEG Expanded Abstracts* 8, pp. 1129-1132.
Vigh, D. et al. (2008), "3D prestack plane-wave, full-waveform inversion," *Geophysics* 73(5), pp. VE135-VE144.
Wang, Y. (2007), "Multiple prediction through inversion: Theoretical advancements and real data application," Geophysics 72(2), pp. V33-V39.
Wang, K. et al. (2009), "Simultaneous full-waveform inversion for source wavelet and earth model," SEG Int'l. Expo. & Ann. Meeting, Expanded Abstracts, pp. 2537-2541.
Weglein, A.B. (2003), "Inverse scattering series and seismic exploration," *Inverse Problems* 19, pp. R27-R83.
Wu R-S. et al. (2006), "Directional illumination analysis using beamlet decomposition and propagation," *Geophysics* 71(4), pp. S147-S159.
Xia, J. et al. (2004), "Utilization of high-frequency Rayleigh waves in near-surface geophysics," *The Leading Edge*, pp. 753-759.
Xie, X. et al. (2002), "Extracting angle domain information from migrated wavefield," *SEG Expanded Abstracts*21, pp. 1360-1363.
Xie, X.-B. et al. (2006), "Wave-equation-based seismic illumination analysis," *Geophysics* 71(5), pp. S169-S177.
Yang, K. et al. (2000), "Quasi-Orthogonal Sequences for Code-Division Multiple-Access Systems," *IEE Transactions on Information Theory* 46(3), pp. 982-993.
Yoon, K. et al. (2004), "Challenges in reverse-time migration," *SEG Expanded Abstracts* 23, pp. 1057-1060.
Young, J. et al. (2011), "An application of random projection to parameter estimation in partial differential equations," SIAM, 20 pgs.
Zhang, Y. (2005), "Delayed-shot 3D depth migration," *Geophysics* 70, pp. E21-E28.
Ziolkowski, A. (1991), "Why don't we measure seismic signatures?," *Geophysics* 56(2), pp. 190-201.
International Preliminary Report on Patentability, PCT/US13/22723, dated Nov. 17, 2014.
Abt, D.L. et al. (2010), "North American lithospheric discontinuity structured imaged by Ps and Sp receiver functions", *J. Geophys. Res.*, 24 pgs.
Akerberg, P., et al. (2008), "Simultaneous source separation by sparse radon transform," 78th SEG Annual International Meeting, *Expanded Abstracts*, pp. 2801-2805.
Aki, K. et al. (1980), "Quantitative Seismology: Theory and Methods vol. I—Chapter 7—Surface Waves in a Vertically Heterogenous Medium," W.H. Freeman and Co., pp. 259-318.
Aki, K. et al. (1980), "Quantitative Seismology: Theory and Methods vol. I," W.H. Freeman and Co., p. 173.
Anderson, J.E. et al. (2008), "Sources Near the Free-Surface Boundary: Pitfalls for Elastic Finite-Difference Seismic Simulation and Multi-Grid Waveform Inversion," 70th EAGE Conf. & Exh., 4 pgs.
Baumstein, A. et al. (2009), "Scaling of the Objective Function Gradient for Full Wavefield Inversion," SEG Houston 2009 Int'l. Expo and Annual Meeting, pp. 224-2247.
Beasley, C. (2008), "A new look at marine simultaneous sources," *The Leading Edge* 27(7), pp. 914-917.
Beaty, K.S. et al. (2003), "Repeatability of multimode Rayleigh-wave dispersion studies," *Geophysics* 68(3), pp. 782-790.
Beaty, K.S. et al. (2002), "Simulated annealing inversion of multimode Rayleigh wave dispersion waves for geological structure," *Geophys. J. Int.* 151, pp. 622-631.
Becquey, M. et al. (2002), "Pseudo-Random Coded Simultaneous Vibroseismics," SEG Int'l. Exposition and 72th Annl. Mtg., 4 pgs.
Berkhout, A.J. (1987), "Applied Seismic Wave Theory," Elsevier Science Publishers, p. 142.
Berkhout, A.J. (1992), "Areal shot record technology," *Journal of Seismic Exploration* 1, pp. 251-264.
Berkhout, A.J. (2008), "Changing the mindset in seismic data acquisition," *The Leading Edge* 27(7), pp. 924-938.
Ben-Hadj-Ali, H. et al. (2009), "Three-dimensional frequency-domain full waveform inversion with phase encoding," *SEG Expanded Abstracts*, pp. 2288-2292.
Beylkin, G. (1985), "Imaging of discontinuities in the inverse scattring problem by inversion of a causal generalized Radon transform," *J. Math. Phys.* 26, pp. 99-108.
Bonomi, E. et al. (2006), "Wavefield Migration plus Monte Carlo Imaging of 3D Prestack Seismic Data," *Geophysical Prospecting* 54, pp. 505-514.
Boonyasiriwat, C. et al. (2010), 3D Multisource Full-Waveform using Dynamic Random Phase Encoding, SEG Denver 2010 Annual Meeting, pp. 1044-1049.
Boonyasiriwat, C. et al. (2010), 3D Multisource Full-Waveform using Dynamic Random Phase Encoding, SEG Denver 2010 Annual Meeting, pp. 3120-3124.
Bunks, C., et al. (1995), "Multiscale seismic waveform inversion," *Geophysics* 60, pp. 1457-1473.
Burstedde, G. et al. (2009), "Algorithmic strategies for full waveform inversion: 1D experiments," *Geophysics* 74(6), pp. WCC17-WCC46.
Chavent, G. et al. (1999), "An optimal true-amplitude least-squares prestack depth-migration operator," *Geophysics* 64(2), pp. 508-515.
Clapp, R.G. (2009), "Reverse time migration with random boundaries," SEG International Exposition and Meeting, *Expanded Abstracts*, pp. 2809-2813.
Dai, W. et al. (2010), "3D Multi-source Least-squares Reverse Time Migration," SEG Denver 2010 Annual Meeting, pp. 3120-3124.
Delprat-Jannuad, F. et al. (2005), "A fundamental limitation for the reconstruction of impedance profiles from seismic data," *Geophysics* 70(1), pp. R1-R14.
Dickens, T.A. et al. (2011), RTM angle gathers using Poynting vectors, *SEG Expanded Abstracts* 30, pp. 3109-3113.
Downey, N. et al. (2011), "Random-Beam Full-Wavefield Inversion," *SEG Expand Abstracts*, pp. 2423-2427.
Dunkin, J.W. et al. (1973), "Effect of Normal Moveout on a Seismic Pluse," *Geophysics* 38(4), pp. 635-642.
Dziewonski A. et al. (1981), "Preliminary Reference Earth Model", *Phys. Earth Planet. Int.* 25(4), pp. 297-356.
Ernst, F.E. et al. (2000), "Tomography of dispersive media," *J. Acoust. Soc. Am* 108(1), pp. 105-116.
Ernst, F.E. et al. (2002), "Removal of scattered guided waves from seismic data," *Geophysics* 67(4), pp. 1240-1248.
Esmersoy, C. (1990), "Inversion of P and SV waves from multicomponent offset vertical seismic profiles", *Geophysics* 55(1), pp. 39-50.
Fallat, M.R. et al. (1999), "Geoacoustic inversion via local, global, and hybrid algorithms," *Journal of the Acoustical Society of America* 105, pp. 3219-3230.
Fichtner, A. et al. (2006), "The adjoint method in seismology I. Theory," *Physics of the Earth and Planetary Interiors* 157, pp. 86-104.
Forbriger, T. (2003), "Inversion of shallow-seismic wavefields: I. Wavefield transformation," *Geophys. J. Int.* 153, pp. 719-734.
Gibson, B. et al. (1984), "Predictive deconvolution and the zero-phase source," *Geophysics* 49(4), pp. 379-397.
Griewank, A. (1992), "Achieving logarithmic growth of temporal and spatial complexity in reverse automatic differentiation," 1 *Optimization Methods and Software*, pp. 35-54.
U.S. Appl. No. 13/224,005, filed Sep. 1, 2011, Routh et al.

\* cited by examiner

ORTHOGONAL SOURCE AND RECEIVER ENCODING

CROSS-REFERENCE TO RELATED APPLICATION

This application claims priority from both U.S. Provisional Patent Application Nos. 61/608,435 filed on Mar. 8, 2012, entitled Orthogonal Source and Receiver Encoding and U.S. Provisional Patent Application No. 61/726,319 filed on Nov. 14, 2012 entitled Orthogonal Source and Receiver Encoding, both of which are incorporated by reference herein in their entirety.

FIELD OF THE INVENTION

The invention relates generally to the field of geophysical prospecting, and more particularly to geophysical data processing. Specifically, the invention is a method for inversion of data acquired from multiple geophysical sources such as seismic sources, involving geophysical simulation that computes the data from many simultaneously-active geophysical sources in one execution of the simulation.

BACKGROUND OF THE INVENTION

Even with modern computing power, seismic full wavefield inversion is still a computationally expensive endeavor. However, the benefit of obtaining a detailed representation of the subsurface using this method is expected to outweigh this impediment. Development of algorithms and workflows that lead to faster turn-around time is a key step towards making this technology feasible for field scale data. Seismic full waveform inversion involves several iterations of forward and adjoint simulation of the data. Therefore techniques that reduce the cost of forward and adjoint computation runs will allow users to solve larger scale problems in a reasonable amount of time.

Geophysical inversion [1,2] attempts to find a model of subsurface properties that optimally explains observed data and satisfies geological and geophysical constraints. There are a large number of well known methods of geophysical inversion. These well known methods fall into one of two categories, iterative inversion and non-iterative inversion. The following are definitions of what is commonly meant by each of the two categories:

Non-iterative inversion—inversion that is accomplished by assuming some simple background model and updating the model based on the input data. This method does not use the updated model as input to another step of inversion. For the case of seismic data these methods are commonly referred to as imaging, migration, diffraction tomography or Born inversion.

Iterative inversion—inversion involving repetitious improvement of the subsurface properties model such that a model is found that satisfactorily explains the observed data. If the inversion converges, then the final model will better explain the observed data and will more closely approximate the actual subsurface properties. Iterative inversion usually produces a more accurate model than non-iterative inversion, but is much more expensive to compute.

Iterative inversion is generally preferred over non-iterative inversion, because it yields more accurate subsurface parameter models. Unfortunately, iterative inversion is so computationally expensive that it is impractical to apply it to many problems of interest. This high computational expense is the result of the fact that all inversion techniques require many compute intensive simulations. The compute time of any individual simulation is proportional to the number of sources to be inverted, and typically there are large numbers of sources in geophysical data, where the term source as used in the preceding refers to an activation location of a source apparatus. The problem is exacerbated for iterative inversion, because the number of simulations that must be computed is proportional to the number of iterations in the inversion, and the number of iterations required is typically on the order of hundreds to thousands.

The most commonly employed iterative inversion method employed in geophysics is cost function optimization. Cost function optimization involves iterative minimization or maximization of the value, with respect to the model M, of a cost function S(M) which is a measure of the misfit between the calculated and observed data (this is also sometimes referred to as the objective function), where the calculated data are simulated with a computer using the current geophysical properties model and the physics governing propagation of the source signal in a medium represented by a given geophysical properties model. The simulation computations may be done by any of several numerical methods including but not limited to finite difference, finite element or ray tracing. The simulation computations can be performed in either the frequency or time domain.

Cost function optimization methods are either local or global [3]. Global methods simply involve computing the cost function S(M) for a population of models {M1, M2, M3, . . . } and selecting a set of one or more models from that population that approximately minimize S(M). If further improvement is desired this new selected set of models can then be used as a basis to generate a new population of models that can be again tested relative to the cost function S(M). For global methods each model in the test population can be considered to be an iteration, or at a higher level each set of populations tested can be considered an iteration. Well known global inversion methods include Monte Carlo, simulated annealing, genetic and evolution algorithms.

Unfortunately global optimization methods typically converge extremely slowly and therefore most geophysical inversions are based on local cost function optimization. Algorithm 1 summarizes local cost function optimization.

---
Algorithm 1 -
Algorithm for performing local cost function optimization.

1. selecting a starting model
2. computing the gradient of the cost function S(M) with respect to the parameters that describe the model
3. searching for an updated model that is a perturbation of the starting model in the negative gradient direction that better explains the observed data

---

This procedure is iterated by using the new updated model as the starting model for another gradient search. The process continues until an updated model is found that satisfactorily explains the observed data. Commonly used local cost function inversion methods include gradient search, conjugate gradients and Newton's method.

Local cost function optimization of seismic data in the acoustic approximation is a common geophysical inversion task, and is generally illustrative of other types of geophysical inversion. When inverting seismic data in the acoustic approximation the cost function can be written as:

$$S(M) = \sum_{g=1}^{N_g} \sum_{r=1}^{N_r} \sum_{t=1}^{N_t} W(\psi_{calc}(M, r, t, w_g) - \psi_{obs}(r, t, w_g)) \quad \text{(Eqn. 1)}$$

where:
S=cost function,
M=vector of N parameters, $(m_1, m_2, \ldots m_N)$ describing the subsurface model,
g=gather index,
$w_g$=source function for gather g which is a function of spatial coordinates and time, for a point source this is a delta function of the spatial coordinates,
$N_g$=number of gathers,
r=receiver index within gather,
$N_r$=number of receivers in a gather,
t=time sample index within a trace,
$N_t$=number of time samples,
W=minimization criteria function (a preferred choice is $W(x)=x^2$, which is the least squares (L2) criteria),
$\psi_{calc}$=calculated seismic pressure data from the model M,
$\psi_{obs}$=measured seismic pressure data.

The gathers can be any type of gather that can be simulated in one run of a seismic forward modeling program. Usually the gathers correspond to a seismic shot, although the shots can be more general than point sources. For point sources the gather index g corresponds to the location of individual point sources. For plane wave sources g would correspond to different plane wave propagation directions. This generalized source data, $\psi_{obs}$, can either be acquired in the field or can be synthesized from data acquired using point sources. The calculated data $\psi_{calc}$ on the other hand can usually be computed directly by using a generalized source function when forward modeling. For many types of forward modeling, including finite difference modeling, the computation time needed for a generalized source is roughly equal to the computation time needed for a point source.

Equation (1) can be simplified to:

$$S(M) = \sum_{g=1}^{N_g} W(\delta(M, w_g)). \quad \text{(Eqn. 2)}$$

where the sum over receivers and time samples is now implied and, $$\delta(M, w_g) = \psi_{calc}(M, w_g) - \psi_{obs}(w_g). \quad \text{(Eqn. 3)}$$

Inversion attempts to update the model M such that S(M) is a minimum. This can be accomplished by local cost function optimization which updates the given model $M^{(k)}$ as follows:

$$M^{(k+1)} = M^{(k)} - \alpha^{(k)} \nabla_M S(M) \quad \text{(Eqn. 4)}$$

where k is the iteration number, α is the scalar size of the model update, and $\nabla_M S(M)$ is the gradient of the misfit function, taken with respect to the model parameters. The model perturbations, or the values by which the model is updated, are calculated by multiplication of the gradient of the objective function with a step length α, which must be repeatedly calculated.

From equation (2), the following equation can be derived for the gradient of the cost function:

$$\nabla_M S(M) = \sum_{g=1}^{N_g} \nabla_M W(\delta(M, w_g)) \quad \text{(Eqn. 5)}$$

So to compute the gradient of the cost function one must separately compute the gradient of each gather's contribution to the cost function, then sum those contributions. Therefore, the computational effort required for computing $\nabla_M S(M)$ is $N_g$ times the compute effort required to determine the contribution of a single gather to the gradient. For geophysical problems, $N_g$ usually corresponds to the number of geophysical sources and is on the order of 10,000 to 100,000, greatly magnifying the cost of computing $\nabla_M S(M)$.

Note that computation of $\nabla_M W(\delta)$ requires computation of the derivative of $W(\delta)$ with respect to each of the N model parameters $m_i$. Since for geophysical problems N is usually very large (usually more that one million), this computation can be extremely time consuming if it had to be performed for each individual model parameter. Fortunately, the adjoint method can be used to efficiently perform this computation for all model parameters at once [1]. The adjoint method for the least squares objective function and a gridded model parameterization is summarized by the following algorithm:

Algorithm 2 -
Algorithm for computing the least-squares cost-function gradient
of a gridded model using the adjoint method.

1. Compute forward simulation of the data using the current model and the gather signature $w_g$ as the source to get $\psi_{calc}(M^{(k)}, w_g)$,
2. Subtract the observed data from the simulated data giving $\delta(M^{(k)}, w_g)$,
3. Compute the reverse simulation (i.e. backwards in time) using $\delta(M^{(k)}, w_g)$ as the source producing $\psi_{adjoint}(M^{(k)}, w_g)$,
4. Compute the integral over time of the product of $\psi_{calc}(M^{(k)}, w_g)$ and $\psi_{adjoint}(M^{(k)}, w_g)$ to get $\nabla_M W(\delta(M^{(k)}, w_g))$.

While computation of the gradients using the adjoint method is efficient relative to other methods, it is still very costly. In particular the adjoint methods requires two simulations, one forward in time and one backward in time, and for geophysical problems these simulations are usually very compute intensive. Also, as discussed above, this adjoint method computation must be performed for each measured data gather individually, increasing the compute cost by a factor of $N_g$.

The compute cost of all categories of inversion can be reduced by inverting data from combinations of the sources, rather than inverting the sources individually. This may be called simultaneous source inversion. Several types of source combination are known including: coherently sum closely spaced sources to produce an effective source that produces a wavefront of some desired shape (e.g. a plane wave), sum widely spaces sources, or fully or partially stacking the data before inversion.

The compute cost reduction gained by inverting combined sources is at least partly offset by the fact that inversion of the combined data usually produces a less accurate inverted model. This loss in accuracy is due to the fact that information is lost when the individual sources are summed, and therefore the summed data does not constrain the inverted model as strongly as the unsummed data. This loss of information during summation can be minimized by encoding each shot record before summing Encoding before combination preserves significantly more information in the simultaneous source data, and therefore better constrains the inversion [4]. Encoding also allows combination of closely spaced sources, thus allowing more sources to be combined for a given computational region. Various encoding schemes can be used with this technique including time shift encoding and random phase encoding. The remainder of this Background section briefly reviews various published geophysical simultaneous source techniques, both encoded and non-encoded.

Van Manen [6] suggests using the seismic interferometry method to speed up forward simulation. Seismic interferometry works by placing sources everywhere on the boundary of the region of interest. These sources are modeled individually and the wavefield at all locations for which a Green's function is desired is recorded. The Green's function between any two recorded locations can then be computed by cross-correlating the traces acquired at the two recorded locations and summing over all the boundary sources. If the data to be inverted have a large number of sources and receivers that are within the region of interest (as opposed to having one or the other on the boundary), then this is a very efficient method for computing the desired Green's functions. However, for the seismic data case it is rare that both the source and receiver for the data to be inverted are within the region of interest. Therefore, this improvement has very limited applicability to the seismic inversion problem.

Berkhout [7] and Zhang [8] suggest that inversion in general can be improved by inverting non-encoded simultaneous sources that are summed coherently to produce some desired wave front within some region of the subsurface. For example, point source data could be summed with time shifts that are a linear function of the source location to produce a down-going plane wave at some particular angle with respect to the surface. This technique could be applied to all categories of inversion. A problem with this method is that coherent summation of the source gathers necessarily reduces the amount of information in the data. So for example, summation to produce a plane wave removes all the information in the seismic data related to travel time versus source-receiver offset. This information is critical for updating the slowly varying background velocity model, and therefore Berkhout's method is not well constrained. To overcome this problem many different coherent sums of the data (e.g. many plane waves with different propagation directions) could be inverted, but then efficiency is lost since the cost of inversion is proportional to the number of different sums inverted. Herein, such coherently summed sources are called generalized sources. Therefore, a generalized source can either be a point source or a sum of point sources that produces a wave front of some desired shape.

Van Riel [9] suggests inversion by non-encoded stacking or partial stacking (with respect to source-receiver offset) of the input seismic data, then defining a cost function with respect to this stacked data which will be optimized. Thus, this publication suggests improving cost function based inversion using non-encoded simultaneous sources. As was true of the Berkhout's [6] simultaneous source inversion method, the stacking suggested by this method reduces the amount of information in the data to be inverted and therefore the inversion is less well constrained than it would have been with the original data.

Mora [10] proposes inverting data that is the sum of widely spaced sources. Thus, this publication suggests improving the efficiency of inversion using non-encoded simultaneous source simulation. Summing widely spaced sources has the advantage of preserving much more information than the coherent sum proposed by Berkhout. However, summation of widely spaced sources implies that the aperture (model region inverted) that must be used in the inversion must be increased to accommodate all the widely spaced sources. Since the compute time is proportional to the area of this aperture, Mora's method does not produce as much efficiency gain as could be achieved if the summed sources were near each other.

Ober [11] suggests speeding up seismic migration, a special case of non-iterative inversion, by using simultaneous encoded sources. After testing various coding methods, Ober found that the resulting migrated images had significantly reduced signal-to-noise ratio due to the fact that broad band encoding functions are necessarily only approximately orthogonal. Thus, when summing more than 16 shots, the quality of the inversion was not satisfactory. Since non-iterative inversion is not very costly to begin with, and since high signal-to-noise ratio inversion is desired, this technique is not widely practiced in the geophysical industry.

Ikelle [12] suggests a method for fast forward simulation by simultaneously simulating point sources that are activated (in the simulation) at varying time intervals. A method is also discussed for decoding these time-shifted simultaneous-source simulated data back into the separate simulations that would have been obtained from the individual point sources. These decoded data could then be used as part of any conventional inversion procedure. A problem with Ikelle's method is that the proposed decoding method will produce separated data having noise levels proportional to the difference between data from adjacent sources. This noise will become significant for subsurface models that are not laterally constant, for example from models containing dipping reflectors. Furthermore, this noise will grow in proportion to the number of simultaneous sources. Due to these difficulties, Ikelle's simultaneous source approach may result in unacceptable levels of noise if used in inverting a subsurface that is not laterally constant.

Source encoding proposed by Krebs et al. in PCT Patent Application Publication No. WO 2008/042081, which is incorporated herein by reference in all jurisdictions that allow it, is a very cost effective method to invert full wave field data. (The same approach of simultaneous inversion of an encoded gather will work for receivers, either via source-receiver reciprocity or by encoding the actual receiver locations in common-source gathers of data.) For fixed receivers, the forward and adjoint computations only need to be performed for a single effective source; see PCT Patent Application Publication No. WO 2009/117174 [reference 4], which is incorporated herein by reference in all jurisdictions that allow it. Given the fact that hundreds of shots are recorded for typical 2D acquisition geometries, and thousands in the case of 3D surveys, computational savings from this method are quite significant. In practice, a fixed receiver assumption is not strictly valid for most common field data acquisition geometries. In the case of marine streamer data, both sources and receivers move for every new shot. Even in surveys where the locations of receivers are fixed, the practice often is that not all receivers are "listening" to every shot, and the receivers that are listening can vary from shot-to-shot. This also violates the "fixed-receiver assumption." In addition, due to logistical problems, it is difficult to record data close to the source, and this means that near-offset data are typically missing. This is true for both marine and land surveys. Both of these factors mean that for a simultaneous source gather, every receiver location will be missing data for some source shots; those sources are said not to have illuminated the receiver location. In summary, in simultaneous encoded-source inversion, for a given simultaneous encoded gather, data are required at all receiver locations for every shot, and this may be referred to as the fixed-receiver assumption of simultaneous encoded-source inversion. In WO 08/042,081 [reference 5], some of the disclosed embodiments may work better than others when the fixed-receiver assumption is not satisfied. Therefore, it would be advantageous to have an accommodation or adjustment to straightforward application of simultaneous encoded sources (and/or receivers) inversion that would enhance its performance when the fixed-receiver assumption is compromised. The present invention provides a way of doing this. Other approaches to the problem of moving receivers are disclosed in the following U.S. patent application Ser. Nos. 12/903,744, 12/903,749 and 13/224,005. Haber et al. [15] also describe an approach to the problem of moving receivers in simultaneous encoded source inversion using a stochastic optimization method, and apply it to a direct current resistivity problem.

Young and Ridzal [16] use a dimension reduction technique called random projection to reduce the computational cost of estimating unknown parameters in models based on partial differential equations (PDEs). In this setting, the repeated numerical solution of the discrete PDE model dominates the cost of parameter estimation. In turn, the size of the discretized PDE corresponds directly to the number of physical experiments. As the number of experiments grows, parameter estimation becomes prohibitively expensive. In order to reduce this cost, the authors develop an algorithmic technique based on random projection that solves the parameter estimation problem using a much smaller number of so-called encoded experiments, which are random sums of physical experiments. Using this construction, the authors provide a lower bound for the required number of encoded experiments. This bound holds in a probabilistic sense and is independent of the number of physical experiments. The authors also show that their formulation does not depend on the underlying optimization procedure and may be applied to algorithms such as Gauss-Newton or steepest descent.

SUMMARY OF THE INVENTION

In one embodiment, the invention is a computer implemented method for iterative inversion of measured geophysical data to determine a physical properties model for a subsurface region, comprising using a computer to sum a plurality of encoded gathers of the measured geophysical data, each gather being associated with a single source and encoded with a different encoding function selected from a set of encoding functions that are orthogonal or pseudo-orthogonal with respect to cross-correlation, thereby forming a simultaneous encoded gather of measured geophysical data representing a plurality of sources, then using an assumed physical properties model or an updated physical properties model from a prior iteration to simulate the simultaneous encoded gather of measured geophysical data, then computing an objective function measuring misfit between the simultaneous encoded gather of measured geophysical data and the simulated simultaneous encoded gather, then optimizing the objective function to determine a model update, wherein receivers are encoded to make computation of the objective function less sensitive to one or more of the plurality of sources for a given receiver.

In a more detailed embodiment, with reference to the flowchart of FIG. 3, the invention is a computer-implemented method for inversion of measured geophysical data to determine a physical properties model for a subsurface region, comprising:

(a) obtaining a group of two or more gathers 30 of the measured geophysical data, wherein each gather is associated with a single source;
(b) encoding each gather with a different encoding function 32 wherein the encoding is orthogonal or pseudo-orthogonal with respect to cross-correlation;
(c) summing 35 the encoded gathers in the group by summing all data records in each gather that correspond to a single receiver and repeating for each different receiver, resulting in a simultaneous encoded-source gather;
(d) assuming a physical properties model 33 of the subsurface region, said model providing values of at least one physical property at locations throughout the subsurface region;
(e) using the assumed physical properties model, simulating the simultaneous encoded-source gather, encoding source signatures 31 in the simulation using the same encoding functions 32 used to encode corresponding gathers of measured data, wherein an entire simultaneous encoded-source gather is simulated in a single simulation operation 34;
(f) calculating a difference 36 for each receiver between the simultaneous encoded-source gather made up of measured geophysical data and the simulated simultaneous encoded-source gather, said difference being referred to as the residual 37 for that receiver;
(g) applying receiver encoding 38 to each residual, said receiver encoding being selected to attenuate contributions from sources for which the receiver was inactive;
(h) computing an objective function 39 from the receiver-encoded residuals, and updating the assumed physical properties model 40 based on the objective function computation;
(i) repeating (b)-(h) at least one more iteration, using the updated physical properties model 41 from the previous iteration as the assumed physical properties model, to produce a further updated physical properties model of the subsurface region; and
(j) downloading the further updated physical properties model or saving it to computer storage;

wherein, at last one of (a)-(j) are performed using a computer.

Efficiency of the method may be further improved by grouping several sources into a super-source, grouping the corresponding gathers into a super-gather, and then applying the above encoding strategy. For each group, the gathers—both simulated measured—may be adjusted to contain traces that all sources in the group illuminate. Alternatively, one may first group all shots into one global group, simulate once, and then gradually remove the errors from the result. The errors consist of responses to a source at traces which the source did not illuminate in the acquisition survey. Thus, the additional groups, which may be called error groups, of this scheme aim to compute the combined effect of such errors. Further efficiency may be achieved by doubly encoding source signatures and source gathers; one encoding may be the orthogonal, frequency-based encoding of the present invention, and the other encoding may be the +1/−1 encoding of reference [17].

It should be noted that the roles of source and receiver may be interchanged using the reciprocity theorem of acoustics, elastic wave propagation, and electricity and magnetism. It will be understood throughout, including in the claims, that whenever "source" or "receiver" are referred to, those designations will be understood to include the reverse resulting from application of reciprocity.

BRIEF DESCRIPTION OF THE DRAWINGS

The present invention and its advantages will be better understood by referring to the following detailed description and the attached drawings in which.

Figure 1:
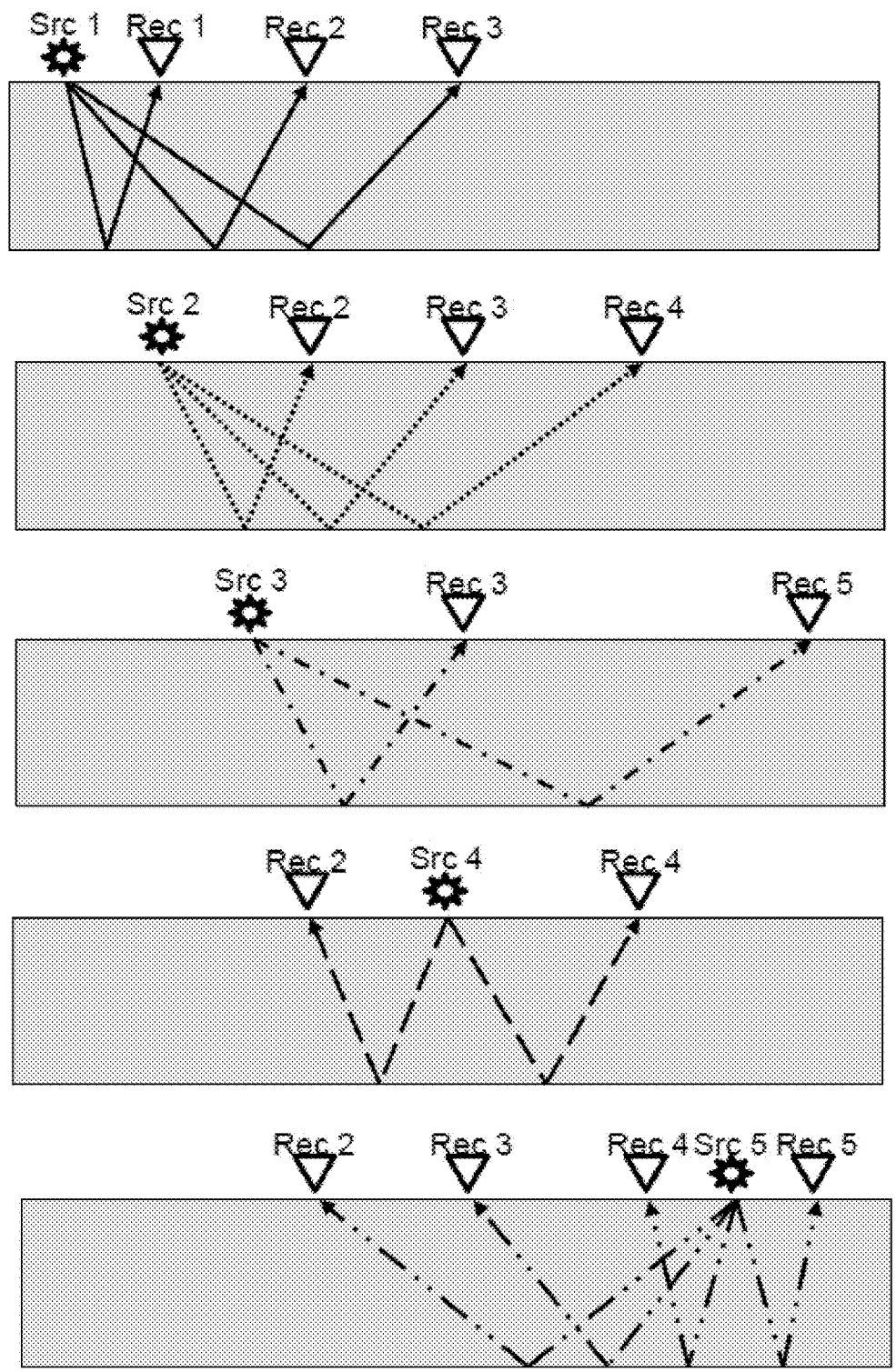
FIG. 1 is a diagram illustrating data acquired from a non-fixed receiver spread.

Due to patent law restrictions, one or more of the drawings are black-and-white reproductions of color originals. The color originals have been filed in the counterpart U.S. application. Copies of this patent or patent application publication with the color drawings may be obtained from the US Patent and Trademark Office upon request and payment of the necessary fee.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Simultaneous source encoding disclosed by Krebs et al. [5, 17] has significantly reduced the computational cost of full waveform inversion. The savings are significant when several hundreds of shots for 2D surveys and thousands for 3D surveys are reduced to a single simultaneous source simulation for forward and the adjoint computations. However, the simultaneous encoding of the data assumes fixed receiver geometry i.e., for each receiver all shots are live. Otherwise, for any given receiver location, the measured simultaneous source trace will not contain contributions that came from sources for which that receiver location was inactive. Yet, for that same receiver location, the simulated simultaneous source trace will contain contributions from all sources. Thus, even for the case of an exactly correct model and no noise, the difference between the measured and simulated simultaneous source data will not be zero. Even worse, it is unlikely that a perfectly correct model will minimize the residual. Minimization for the exact model is a requirement for iterative inversion to produce an accurate model. A majority of the data in hydrocarbon exploration are not acquired with fixed-receiver geometry. The present invention is a method for making simultaneous encoded source inversion more accurate when the fixed receiver assumption is not satisfied, and thus to make full waveform inversion technology more feasible in such situations.

As stated previously, in a typical marine streamer and land acquisition, the data coverage is insufficient to satisfy the fixed receiver geometry thus limiting the benefits of simultaneous source full wave inversion (FWI) proposed by Krebs et al. [5,17] In addition to geometry considerations, the field data need to be processed to conform to the physics of the forward simulation used in the inversion. For example to use acoustic inversion for inverting elastic data, far offsets are typically muted and the data are processed to remove other elastic effects. Other practical aspects such as event (reflections, refractions, multiples) based windowing for FWI inversion do not work with fixed receiver geometry.

The present inventive method uses simultaneous source encoding using codes that are orthogonal or nearly orthogonal (sometimes referred to as pseudo-orthogonal), and simultaneously encodes receivers so that they are not sensitive to sources that were not active when that receiver was active. The main difference between this approach and the most common embodiment of simultaneous encoded source inversion that would be used when the fixed receiver assumption is satisfied is that receivers are also encoded rather than encoding sources only.

Figure 2:
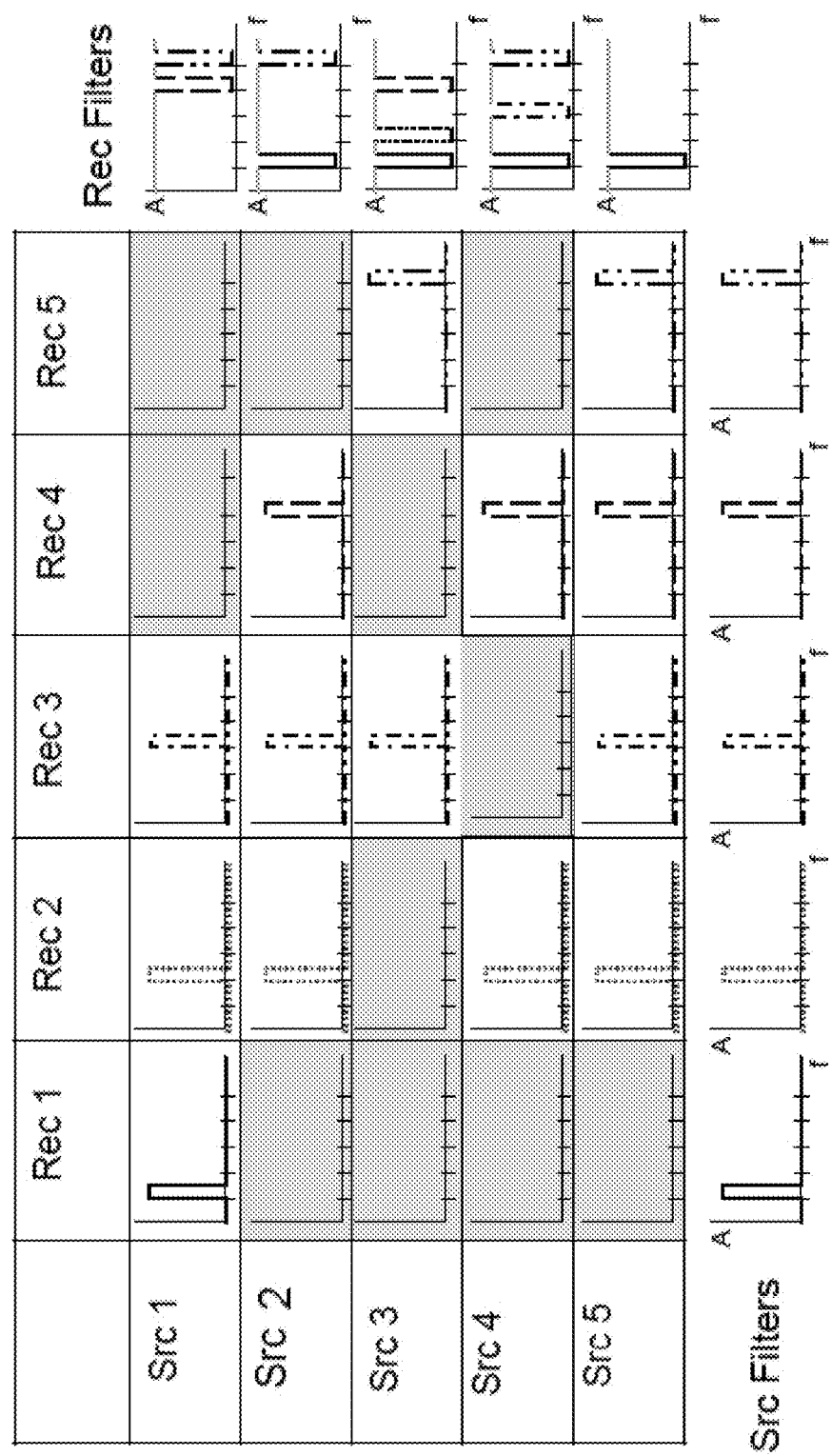
FIG. 2 is a diagram illustrating the source and receiver encodings, corresponding to the acquisition illustrated in FIG. 1, for one embodiment of the present invention.

Basic steps in the present inventive method are represented symbolically in FIG. 2. In FIG. 2, the diagram represents the acquisition for a hypothetical seismic survey shown in FIG. 1. Using line styles selected to correspond to the filters in FIG. 2, the diagram in FIG. 1 shows which receiver locations are active, i.e. are listening, for each source location. Each receiver (five receiver locations are shown in this example, numbered 1 to 5) is not active for all sources (five source locations are shown in this example, numbered 1 to 5), i.e. the fixed-receiver assumption, preferred for conventional simultaneous source inversion, is not satisfied. This is indicated by grey boxes for receivers that are not active for a given source and white boxes of receivers that are active for a given source. In this diagram, encoding is represented as a set of temporal filters whose amplitude (A) versus frequency (f) is shown in the row of graphs below the acquisition table. These filters are tight bandpass filters that are centered on different frequencies for different sources. To the right of the diagram are corresponding receiver filters that are designed to notch out frequencies corresponding to sources for which that receiver was not active. This will ensure that, when simulation and adjoint computations are performed, those receivers will not record energy from those sources that were not acquired in the field data to be inverted. These receiver filters are a key technique that allows simultaneous source inversion to be performed on data from non-fixed spreads in the present invention.

Within each box of the table in FIG. 2 is illustrated the product of the source encoding filter and the receiver encoding filter. Note that in the grey boxes the product is zero while in the white boxes the product is just the original source encoding filter. This is the mechanism by which the receivers are made insensitive to the sources for which they were not active in the data acquisition.

The efficiency gained by the present invention can be estimated as follows. The number of approximately non-overlapping filters determines the number of sources that can be encoded into one simultaneous encoded source. This is approximately equal to the bandwidth of the data divided by the bandwidth of a filter (Eqn. 6). The time length of the time domain code corresponding to the encoding filter is proportional to the inverse of the filter's bandwidth (Eqn 7). The simulation compute effort for encoded simultaneous source data is proportional to the number of time steps that must be computed, which is proportional to sum of the trace length and code length (Eqn. 8). The efficiency gained by this invention is proportional to the simulation effort for unencoded data ($N_{src} \times T_{trace}$) divided by the time to simulate the encoded source ($T_{trace} + T_{code}$) (Eqn. 9). Note that Eqn. 9 implies that the efficiency will improve by increasing the code length, implying it is advantageous to use tighter bandpass filters in the encoding. However, there are diminishing returns from increasing the time length of the code, while on the other hand longer codes may increase the number of iterations needed to converge the inversion.

$$N_{src} \approx \frac{\Delta f_{data}}{\Delta f_{filter}} \quad \text{(Eqn. 6)}$$

$$\Delta f_{filter} \propto \frac{1}{T_{code}} \quad \text{(Eqn. 7)}$$

$$T_{encoded\ simulation} \propto T_{trace} + T_{code} \quad \text{(Eqn. 8)}$$

$$\text{Efficiency} \propto \frac{N_{src} T_{trace}}{T_{encoded\ simulation}} = \frac{\Delta f_{data} T_{trace} T_{code}}{(T_{trace} + T_{code})} \quad \text{(Eqn. 9)}$$

The receiver filters can be naturally implemented within FWI as the covariance matrix that is often included in the objective function norm. This is explained in more detail next.

The iterative method most commonly employed in wave inversion is objective function optimization. Objective function optimization involves iterative minimization of the value, with respect to the model M, of an objective function S(M) which is a measure of the misfit between the calculated and observed data (this is also sometimes referred to as the cost function). The calculated data are simulated with a computer programmed to use the physics governing propagation of the source signal in a medium represented by the current model. The simulation computations may be done by any of several numerical methods including but not limited to finite differences, finite elements or ray tracing. Following Tarantola [1], the most commonly employed objective function is the least squares objective function:

$$S(M) = (u(M) - d)^T C^{-1} (u(M) - d), \quad \text{(Eqn. 10)}$$

where T represent the vector transpose operator and:
M=the model which is a vector of N parameters $[m_1, m_2, \ldots m_N]^T$,
d=measured data vector (sampled with respect to source, receiver and time),
u(M)=simulated data vector for model M (sampled with respect to source, receiver and time),
C=the covariance matrix.

More details may be found in U.S. patent application Ser. No. 13/020,502 and in PCT Patent Application Publication No. WO 2009/117174, both of which are incorporated by reference herein in all jurisdictions that allow it.

The codes used in the present inventive method do not necessarily have to be bandpass filters as illustrated in FIG. 1. Other orthogonal or pseudo-orthogonal codes may be used, for example, Kasami sequences. See "Quasi-orthogonal sequences for code-division multiple-access systems," Kyengcheol Yang, Young-Ky Kim, Vijay Kumar, *Information Theory, IEEE Transactions* 46(3), 382-993 (2000). The codes could also be non-overlapping combs of bandpass filters or other quasi-orthogonal sequences besides Kasami sequences, e.g. Walsh sequences.

The simultaneous source inversion of the present invention may be further enhanced by exploiting structure from the acquisition geometry. Specifically, it is possible to group several sources into a super-source (the group of simultaneous sources), group the corresponding gathers into a super-gather, and then apply the encoding strategy outlined in the present invention. The benefit of such an approach is to multiply the efficiency of the present method by the efficiency of the grouping method. Next, two possible grouping strategies are briefly outlined, and then it is explained how a grouping strategy may be combined with the frequency encoding strategy of the present invention.

One version of the grouping method was disclosed in Ref [20], "Random-Beam Full-Wavefield Inversion", Nathan Downey, Partha Routh and Young Ho Cha, SEG Expanded Abstracts 30, 2423 (2011), DOI:10.1190/1.3627695, which publication is incorporated herein by reference in all jurisdictions that allow it. This method groups the data recorded during a seismic survey into several encoded multi-shot gathers each of which can be modeled using a single numerical simulation. For each group, the gathers—both simulated measured—are adjusted to contain traces that all sources in the group illuminate. In particular, the multi-shot full-wavefield inversion (FWI) scheme developed in Ref [17] by Krebs et al. may be applied to encode the shots. Thus, if the computational cost of simulating each shot independently is n and the number of groups that sufficiently cover the survey is m, then the gains in efficiency are n/m relative to sequential-source inversion.

An alternative grouping scheme is obtained by first grouping all shots into one global group, simulating once, and then gradually removing the errors from the result. The errors consist of responses to a source at traces which the source did not illuminate in the acquisition survey. Thus, the additional groups, which may be called error groups, of this scheme aim to compute the combined effect of such errors. Once computed, the resulting simulated gather of a group is restricted to traces that at least one source in the group does not illuminate. These traces are then subtracted from the corresponding traces in the global gather. So, with each subsequent error group the global group is improved until, eventually, no more errors remain. This requires m error group removals (the same number as in the previous method), which leads to a total computational cost of m+1 simulations. The gain in efficiency is n/(m+1), which is comparable to the gain of the previous grouping method.

Figure 3:
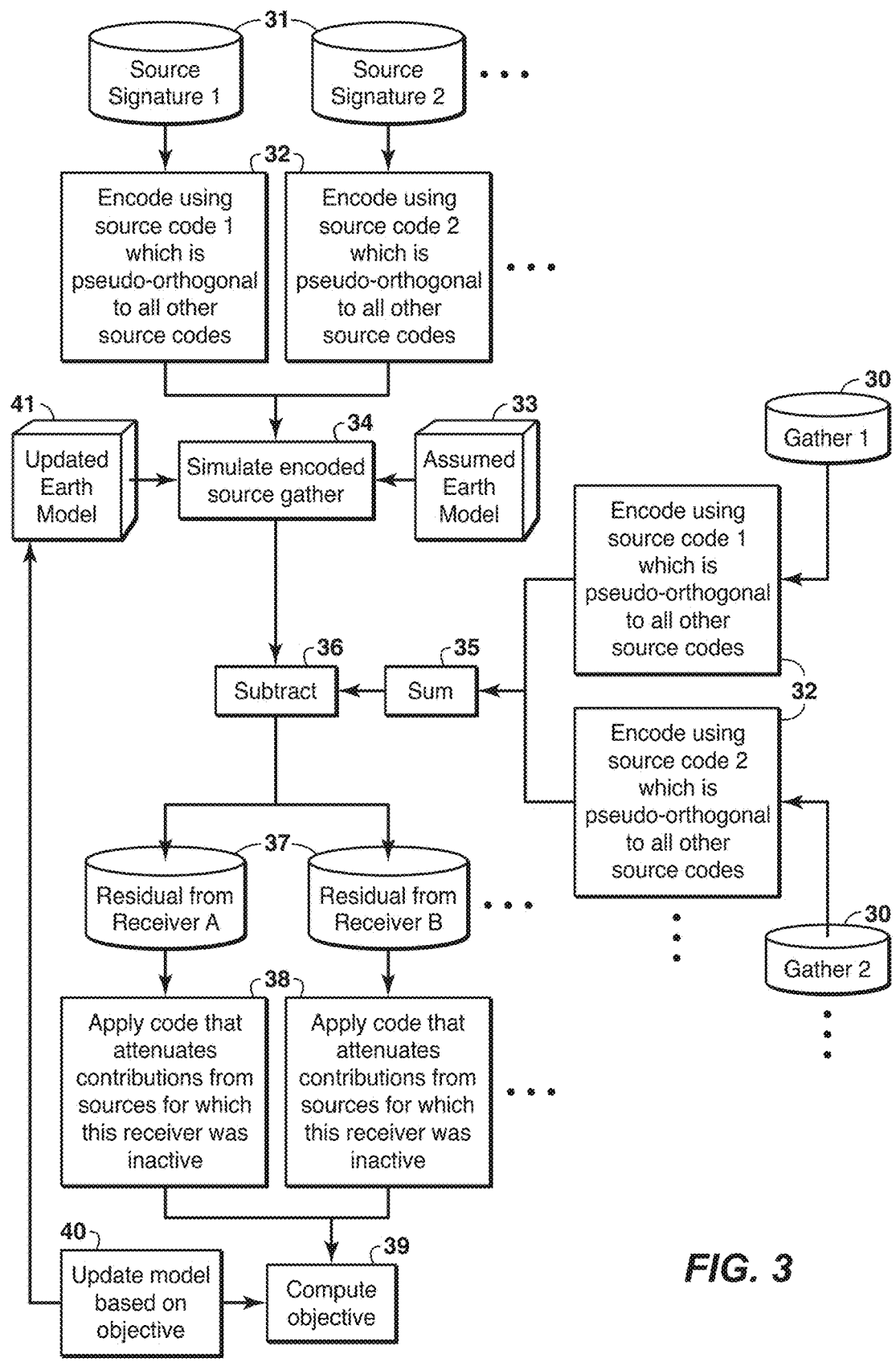
FIG. 3 is a flowchart showing basic steps in one embodiment of the present inventive method.

In more detail, a data inversion method using the alternative grouping scheme, in one of its embodiments, can be described by the following series of basic steps:

1. Perform one simulation of synthetic data ("SD") where every source in the survey is simultaneously active. The sources are encoded. Any of various encoding schemes may be used, including those described in U.S. Pat. No. 8,121,823 (Ref [5]) and also including the +1/−1 and other encoding schemes disclosed in Ref [17], both of which references are incorporated herein by reference in all jurisdictions that allow it; however, if orthogonal or pseudo-orthogonal encoding as described herein is used, additional gains in efficiency may be realized. In one embodiment of the inversion method being described here, the orthogonal encoding is the frequency encoding of step 38 in the FIG. 3 flow chart.

2. Determine a grouping strategy (i.e. which sources to treat simultaneously), where the strategy relates to moving receivers and the desire not to simulate a seismic trace corresponding to a receiver that did not listen to that source. The strategy of the first grouping scheme discussed above (Ref [20]) is also a preferred option for this alternative grouping scheme.

3. For each group, encode the sources, with each source being encoded with the same encoding used in step 1, and then do the following:
   i. Perform a simulation in which every source in the current group is simultaneously active, and produce simultaneous simulated data for the current group of sources ("GSD"). (Note: these data are contained in the SD) The resulting gain in efficiency is n/(m+1) relative to sequential-source inversion; however, if orthogonal or pseudo-orthogonal encoding as described herein is used, several groups may be simulated simultaneously, which will improve the efficiency gain to k·n/(m+1), where the number of groups that are simulated simultaneously is k.

ii. Determine receiver locations in the GSD that were not illuminated by at least one of the sources in the current group.

iii. For each of those locations, retrieve the corresponding signal from the GSD and subtract it from the same location in the SD. Note that this signal includes the error contained in the SD due to the fixed-receiver assumption's not being satisfied. In fact, the subtraction removes more than just the error. It also removes some good data, i.e. simulated data from receivers that were listening to the corresponding sources. However, this is an acceptable price to pay in order to remove all the error from the SD. The full data set is more than is needed to make the inversion work. Moreover, the amount of valid data that are removed can be controlled: the more groups in the grouping strategy, the less valid data are removed. Thus, these groups may be called "error groups" as compared to the groups used in the Ref [20] alternative.

4. Compute the data residual relative to the encoded measured data, with the measured data being encoded using the same encoding function selected for each source in step 1, so that the errors are reproduced exactly as they appear in the simulation of step 1. Before computing the residual, the measured data are adjusted to contain only the valid data remaining after step 3(iii). To do that, it may be noted that the measured data consist of individual source-receiver pairs (or may be converted into that format), so adjusting the measured data consists of adding together the measured source-receiver pairs for all such pairs that were left (i.e., are valid) after step 3(iii), i.e. all sources in a given group and all receivers that would not introduce errors in the computation of the objective function.

5. Adjust the velocity model to reduce the misfit, i.e. to reduce the data residual.

6. Repeat steps 1-5. Note that in the simulations in steps 1 and 3(i), since the velocity model was updated in step 5, the SD and the GSD's will not be the same as in the previous iteration, and therefore the simulations must be performed again.

The present invention may further improve the efficiency of the grouping methods by encoding each group with a code that is orthogonal or pseudo-orthogonal to all other codes. Thus, if k mutually (pseudo-)orthogonal codes are available, then k groups may be simulated simultaneously. The total cost of the grouping methods then becomes m/k for method 1 and (m+1)/k for method two. Compared to the sequential shot scheme, this combined approach incurs k*n/m times less computational cost. The overall method (for the Ref [20] grouping scheme) therefore may be described by the flowchart of FIG. 3 where the gathers 30 are the multi-shot gathers described above, i.e. groups of shot gathers where the grouping is based on illuminated receivers, and each individual shot gather in a multi-shot gather is encoded with the same encoding function. Similarly, the source signatures 31 are each a group of source signatures corresponding to the groups of shot gathers, and each source signature in a group is encoded with the same encoding. It is of note that the frequency encoding of the present invention does not interfere with the encoding of the multi-shot scheme such as is described in Ref [17] and which may be used in the grouping methods above; i.e. they are compatible. So, in this combined scheme, a source and corresponding gather are doubly-encoded. It may be possible to alternatively use some other form of encoding, for example phase encoding, as the orthogonal or pseudo-orthogonal encoding in a double encoding scheme. The non-orthogonal encoding in a double encoding scheme may be any encoding as long as it does not affect the orthogonal encoding, i.e. change the frequencies used in the case of frequency encoding.

The advantage to double encoding is that more gathers can be simulated simultaneously. Using frequency encoding only, the nature of the source signature is exploited, so the number of efficient, different, orthogonal codes is limited. This limit may be increased by grouping shot gathers whenever data redundancy allows it. In essence, each group is constructed to behave like a small fixed-spread problem (discussed in Ref 20), so a +1/−1 encoding within a group may efficiently solve this smaller problem. In other words, this double encoding exploits two distinct and independent characteristics of the problem: (1) the nature of the source signature, and (2) the geometry of the survey (data acquisition). The sources may all be doubly encoded in both of the grouping schemes described above. The measured data corresponding to a given source must also be encoded in the same way as the source signature is encoded for simulation. However, to perform the residual calculations, the receivers may be decoded using only a combination of frequency filters.

A preferred embodiment of the invention using double encoding in the alternative scheme described above, where the groups are error groups, will now be described. In a first phase (not in the FIG. 3 flowchart, but described in step 1 of the six-step description given above for the alternative grouping scheme), a super-gather is computed, one containing all shots. Here, the +1/−1 encoding of Ref 17 may be used, ignoring for the moment that errors will be introduced due to receivers not illuminated by a particular source. That is, a +1 or a −1 multiplicative factor is assigned to each source and related measured data. Each error group in the steps to come will be assigned part of the frequency spectrum for the orthogonal encoding (step 3i above, with orthogonal (frequency) encoding), but those assignments may be made in this first phase. Thus, each source-data pair is doubly encoded: with a +1/−1 multiplicative factor and by modifying their spectrum. Then, in a second phase, corresponding to step 3 above, the errors are removed as described there by progressively subtracting the result of smaller multi-gathers—the error grouping—from the super-gather obtained in phase 1. Here, we use the same multiplicative (+1/−1) factor as in the first phase. Also, each group is filtered to have the same spectrum as chosen in phase 1. In other words, the same double encoding is used again. Finally, in the third phase, the residuals are computed (step 4 above), then the model update is computed (step 5 above), possibly using a gradient method. This concludes one iteration, and a next iteration may follow (step 6 above).

It may be noted that the embodiment of the invention using the first grouping scheme, i.e. the grouping of Ref 20, also has a first phase (not shown in FIG. 3) in which the groups are chosen. Double encoding of the sources and corresponding measured data may also be performed with this grouping scheme. It may be noted that the +1/−1 encoding may be used to mitigate cross-talk noise during the residual calculation of each group. This noise is specific to a group; noise from one group does not affect other groups. The orthogonal encoding ensures that behavior. Therefore, the +1/−1 encoding in this scheme may be applied to each group independently, without consideration of elements in other groups. Also, as Ref [5] was the first to discover, it may be advantageous to change the specific encoding functions each iteration.

The simultaneous source inversion of the present invention can be further enhanced by changing the encoding functions used between iterations. This is because changing the amplitude spectrum and/or phase of the filters between iterations will result in producing a model that fits more frequencies from each source. Changing the encodings will also reduce crosstalk noise which will occur for encoding functions which are not perfectly orthogonal. The change of encoding may include, for example, either or both of changing the central frequency of the source filters and changing their phase.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. For example, persons skilled in the art will readily recognize that it is not required that all sources be encoded into a single simultaneous source, but instead sub-groups of sources could be encoded and the gradients results from each sub-group could then be summed to produce a total gradient. (Computing the gradient of the objective function with respect to each of the model parameters is a common way of determining an update to the model.) Persons skilled in the art will readily recognize that in preferred embodiments of the invention, at least some of the steps in the present inventive method are performed on a computer, i.e. the invention is computer implemented. In such cases, the resulting updated physical properties model may either be downloaded, displayed, or saved to computer storage.

REFERENCES

1. Tarantola, A., "Inversion of seismic reflection data in the acoustic approximation," *Geophysics* 49, 1259-1266 (1984).
2. Sirgue, L., and Pratt G. "Efficient waveform inversion and imaging: A strategy for selecting temporal frequencies," *Geophysics* 69, 231-248 (2004).
3. Fallat, M. R., Dosso, S. E., "Geoacoustic inversion via local, global, and hybrid algorithms," *Journal of the Acoustical Society of America* 105, 3219-3230 (1999).
4. Hinkley, D. and Krebs, J., "Gradient computation for simultaneous source inversion," PCT Patent Application Publication No. WO 2009/117174.
5. Krebs, J. R., Anderson, J. A., Neelamani, R., Hinkley, D., Jing, C., Dickens, T., Krohn, C., Traynin, P., "Iterative inversion of data from simultaneous geophysical sources," PCT Patent Application Publication No. WO 2008/042081, issued as U.S. Pat. No. 8,121,823.
6. Van Manen, D. J., Robertsson, J. O. A., Curtis, A., "Making wave by time reversal," *SEG International Exposition and $75^{th}$ Annual Meeting Expanded Abstracts,* 1763-1766 (2005).
7. Berkhout, A. J., "Areal shot record technology," *Journal of Seismic Exploration* 1, 251-264 (1992).
8. Zhang, Y., Sun, J., Notfors, C., Gray, S. H., Cherris, L., Young, J., "Delayed-shot 3D depth migration," *Geophysics* 70, E21-E28 (2005).
9. Van Riel, P., and Hendrik, W. J. D., "Method of estimating elastic and compositional parameters from seismic and echo-acoustic data," U.S. Pat. No. 6,876,928 (2005).
10. Mora, P., "Nonlinear two-dimensional elastic inversion of multi-offset seismic data," *Geophysics* 52, 1211-1228 (1987).
11. Ober, C. C., Romero, L. A., Ghiglia, D. C., "Method of Migrating Seismic Records," U.S. Pat. No. 6,021,094 (2000).
12. Ikelle, L. T., "Multi-shooting approach to seismic modeling and acquisition," U.S. Pat. No. 6,327,537 (2001).
13. Romero, L. A., Ghiglia, D. C., Ober, C. C., Morton, S. A., "Phase encoding of shot records in prestack migration," *Geophysics* 65, 426-436 (2000).
14. Jing X., Finn, C. J., Dickens, T. A., Willen, D. E., "Encoding multiple shot gathers in prestack migration," *SEG International Exposition and $70^{th}$ Annual Meeting Expanded Abstracts,* 786-789 (2000).
15. Haber, E., Chung M. and Herrmann, "An effective method for parameter estimation with PDE constraints with multiple right hand sides," Preprint—UBC http://www.math.ubc.ca/~haber/pubs/PdeOptStochV5.pdf (2010).
16. Joseph Young and Denis Ridzal, "An application of random projection to parameter estimation," SIAM Optimization, Darmstadt (May 17, 2011).
17. Jerome R. Krebs, John E. Anderson, David Hinkley, Ramesh Neelamani, Sunwoong Lee, Anatoly Baumstein, and Martin-Daniel Lacasse, "Full-wavefield seismic inversion using encoded sources," *Geophysics* 74-6, WCC177-WCC188 (2009).
18. Yang et al., "Quasi-orthogonal sequences for code-division multiple-access systems," *Information Theory, IEEE Transactions* 46(3), 982-993 (2000).
19. Krebs, et al., "Full Wavefield Inversion Using Time Varying Filters," U.S. Pat. No. 8,223,587 (2012).
20. Downey, et al., "Random-Beam Full-Wavefield Inversion," *SEG Expanded Abstracts* 30, 2423-2427 (2011).
21. Yunsong Huang and Gerard T. Schuster, "Multisource least-squares migration of marine streamer and land data with frequency-division encoding," EAGE Annual Meeting, Copenhagen, Workshop on Simultaneous Source Methods for Seismic Data, (Jun. 3, 2012).
22. Yunsong Huang and Gerard T. Schuster, "Multisource least-squares migration of marine streamer and land data with frequency-division encoding," *Geophysical Prospecting* 60, 663-680 (July 2012).

The invention claimed is:

1. A computer implemented method for iterative inversion of measured geophysical data to determine a physical properties model for a subsurface region, comprising:

acquiring the measured geophysical data with a source or group of sources and receivers, using a computer to sum a plurality of encoded gathers of the measured geophysical data, each gather being associated with a single source or group of sources and encoded with a different encoding function selected from a set of encoding functions that are orthogonal or pseudo-orthogonal to each other with respect to cross-correlation, thereby forming a simultaneous encoded gather of measured geophysical data representing a plurality of sources, then using an assumed physical properties model or an updated physical properties model from a prior iteration to simulate the simultaneous encoded gather of measured geophysical data, then computing an objective function measuring misfit between the simultaneous encoded gather of measured geophysical data and the simulated simultaneous encoded gather, then optimizing the objective function to determine a model update to the assumed physical properties model and generate the physical properties model of the subsurface region, and using the physical properties model of the subsurface region in prospecting for hydrocarbons within the subsurface region, wherein the receivers are encoded to make computation of the objective function less sensitive to one or more of the plurality of sources, relative to at least one other of the plurality of sources, for a given receiver, wherein the encoding of the receivers is performed using a different encoding function for each receiver, selected to be orthogonal or pseudo-orthogonal with respect to the encoding functions for sources to which the receiver did not listen when the measured geophysical data were measured, wherein the encoding functions for the receivers and the sources are functions of frequency, wherein the source or group of sources is encoded with a set of bandpass filters, differing from each other in central frequency, phase, or both, and wherein the receivers are encoded with a set of notch filters, differing from each other in central frequency, phase, or both, and each of the notch filters is designed to notch out bandpass frequencies of the encoding functions corresponding to the source or group of sources for which that receiver was not active through a combination of corresponding ones of the bandpass filters and the notch filters.

2. The method of claim 1, wherein the phase differences include polarity switches.

3. The method of claim 1, wherein the simulated simultaneous encoded gather is simulated in a single simulation operation, wherein source signatures in the simulation are encoded using the same encoding used to encode corresponding gathers of the measured geophysical data.

4. The method of claim 1, wherein the misfit is measured as a norm of a difference between the simultaneous encoded gather of measured geophysical data and the simulated simultaneous encoded gather or as a cross-correlation between the simultaneous encoded gather of measured geophysical data and the simulated simultaneous encoded gather.

5. The method of claim 1, wherein the measured geophysical data are full wavefield data from a seismic survey.

6. The method of claim 1, wherein in some or all of the iterations, different encoding functions are used compared to a preceding iteration.

7. The method of claim 1, further comprising forming one or more additional simultaneous encoded gathers of measured geophysical data, wherein the model update is determined based on a sum of the objective functions corresponding to each simultaneous encoded gather.

8. The method of claim 1, wherein computing the objective function comprises computing differences, called residuals, by receiver between the simultaneous encoded gather of measured geophysical data and the simulated simultaneous encoded gather, and applying the receiver encoding to each receiver residual, said receiver encoding being selected to attenuate contributions from sources for which the receiver was inactive, relative to contributions from sources for which the receiver was active, then computing the objective function from the receiver-encoded residuals.

9. A computer-implemented method for inversion of measured geophysical data to determine a physical properties model for a subsurface region, comprising:

(a) acquiring the measured geophysical data with a source or group of sources and receivers;

(b) obtaining a group of two or more gathers of the measured geophysical data, wherein each gather is associated with a single source or group of sources;

(c) encoding each gather with a different encoding function wherein the encoding is orthogonal or pseudo-orthogonal with respect to cross-correlation;

(d) summing the encoded gathers in the group by summing all data records in each gather that correspond to a single receiver and repeating for each different receiver, resulting in a simultaneous encoded-source gather;

(e) assuming a physical properties model of the subsurface region, said model providing values of at least one physical property at locations throughout the subsurface region;

(f) using the assumed physical properties model, simulating the simultaneous encoded-source gather, encoding source signatures in the simulation using the same encoding functions used to encode corresponding gathers of measured data, wherein an entire simultaneous encoded-source gather is simulated in a single simulation operation;

(g) calculating a difference for each receiver between the simultaneous encoded-source gather made up of measured geophysical data and the simulated simultaneous encoded-source gather, said difference being referred to as the residual for that receiver;

(h) applying different receiver encoding to each residual, said receiver encoding being selected to attenuate contributions from sources for which the receiver was inactive, relative to contributions from sources for which the receiver was active;

(i) computing an objective function from the receiver-encoded residuals, and updating the assumed physical properties model based on the objective function computation;

(j) repeating (c)-(i) at least one more iteration, using the updated physical properties model from the previous iteration as the assumed physical properties model, to produce a further updated physical properties model of the subsurface region; and (k) downloading the further updated physical properties model or saving it to computer storage and using the further updated physical properties model in prospecting for hydrocarbons within the subsurface region, wherein, at least one of (b)-(k) are performed using a computer, wherein the encoding for each gather and the receiver encoding are functions of frequency, wherein the source or group of sources is encoded with a set of bandpass filters, differing from each other in central frequency, phase, or both, and wherein the receivers are encoded with a set of notch filters, differing from each other in central frequency, phase, or both, and each of the notch filters is designed to notch out bandpass frequencies of the encoding functions corresponding to the source or group of sources for which that receiver was not active through a combination of corresponding ones of the bandpass filters and the notch filters.

10. The method of claim 9, wherein each gather in (b) is a multi-shot gather, each multi-shot gather consisting of a plurality of individual-shot gathers having a common set of illuminated receivers.

11. The method of claim 9, wherein both the encoding in (c) and the encoding in (f) are accompanied by a second encoding, making the gathers in (c) and the source signatures in (f) doubly encoded.

12. The method of claim 11, wherein the second encoding is +1/−1 encoding.

13. A non-transitory computer usable medium having a computer readable program code embodied therein, said computer readable program code adapted to be executed to implement a method for iterative inversion of measured geophysical data to determine a physical properties model for a subsurface region, said method comprising:

acquiring the measured geophysical data with a source or group of sources and receivers;

summing a plurality of encoded gathers of the measured geophysical data, each gather being associated with a single source or group of sources and encoded with a different encoding function selected from a set of encoding functions that are orthogonal or pseudo-orthogonal with respect to cross-correlation, thereby forming a simultaneous encoded gather of measured geophysical data representing a plurality of sources, then using an assumed physical properties model or an updated physical properties model from a prior iteration to simulate the simultaneous encoded gather of measured geophysical data, then computing an objective function measuring misfit between the simultaneous encoded gather of measured geophysical data and the simulated simultaneous encoded gather, then optimizing the objective function to determine a model update to the assumed physical properties model and generate the physical properties model of the subsurface region, and using the physical properties model of the subsurface region in prospecting for hydrocarbons within the subsurface region, wherein the receivers are encoded to make computation of the objective function less sensitive to one or more of the plurality of sources, relative to at least one other of the plurality of sources, for a given receiver, wherein the encoding of the receivers is performed using a different encoding function for each receiver, selected to be orthogonal or pseudo-orthogonal with respect to the encoding functions for sources to which the receiver did not listen when the measured geophysical data were measured, wherein the encoding functions for the receivers and the sources are functions of frequency, wherein the source or group of sources is encoded with a set of bandpass filters, differing from each other in central frequency, phase, or both, and wherein the receivers are encoded with a set of notch filters, differing from each other in central frequency, phase, or both, and each of the notch filters is designed to notch out bandpass frequencies of the encoding functions corresponding to the source or group of sources for which that receiver was not active through a combination of corresponding ones of the bandpass filters and the notch filters.

14. A computer-implemented method for inversion of measured geophysical data to determine a physical properties model for a subsurface region, comprising:

(a) acquiring the measured geophysical data with the source or group of sources and the receivers;

(b) obtaining a group of two or more multi-shot gathers of the measured geophysical data, each multi-shot gather consisting of a plurality of individual-shot gathers having a common set of illuminated receivers;

(c) encoding each multi-shot gather with a different encoding function selected from a set of encoding functions that are orthogonal or pseudo-orthogonal with respect to cross-correlation;

(d) summing the encoded multi-shot gathers by summing all data records in each gather that correspond to a single receiver and repeating for each different receiver, resulting in a simultaneous encoded-source gather;

(e) assuming a physical properties model of the subsurface region, said model providing values of at least one physical property at locations throughout the subsurface region;

(f) using the assumed physical properties model, simulating the simultaneous encoded-source gather, encoding source signatures in the simulation using the same encoding functions used to encode corresponding gathers of the measured data, wherein an entire simultaneous encoded-source gather is simulated, using a programmed computer, in a single simulation operation;

(g) calculating a difference for each receiver between the simultaneous encoded-source gather and the simulated simultaneous encoded-source gather, said difference being referred to as the residual for that receiver;

(h) applying different receiver encoding to each residual, said receiver encoding being selected to attenuate contributions from sources for which the receiver was inactive, relative to contributions from sources for which the receiver was active;

(i) computing an objective function from the receiver-encoded residuals, and updating the assumed physical properties model based on the objective function computation;

(j) repeating (c)-(i) at least one more iteration, using the updated physical properties model from the previous iteration as the assumed physical properties model, to produce a further updated physical properties model of the subsurface region; and (k) downloading the further updated physical properties model or saving it to computer storage and using the further updated physical properties model in prospecting for hydrocarbons within the subsurface region, wherein the encoding for each gather and the receiver encoding are functions of frequency, wherein the source or group of sources is encoded with a set of bandpass filters, differing from each other in central frequency, phase, or both, and wherein the receivers are encoded with a set of notch filters, differing from each other in central frequency, phase, or both, and each of the notch filters is designed to notch out bandpass frequencies of the encoding functions corresponding to the source or group of sources for which that receiver was not active through a combination of corresponding ones of the bandpass filters and the notch filters.

15. A computer-implemented method for inversion of measured data from a geophysical survey to determine a physical properties model for a subsurface region, comprising:

(a) acquiring the measured geophysical data with a source or group of sources and receivers;

(b) simulating, using an assumed physical properties model, all source gathers in the measured geophysical data in a single simulation, using encoding, thereby generating a simulated data set;

(c) determining a grouping strategy that helps distinguish between data records corresponding to a receiver and a source where the receiver did not listen to the source during the geophysical survey;

(d) for each group, encoding the sources, each source being encoded with the same encoding used in (a), and performing steps comprising:
  (i) simulating, using the assumed physical properties model, all source gathers in the group in a single simulation, thereby generating a simulated group data set;
  (ii) determining receiver locations in the simulated group data set that were not illuminated by at least one of the sources in the group;
  (iii) for each of the determined receiver locations, retrieving corresponding data from the simulated group data set and subtracting it from the same receiver location in the simulated data set;

(e) adjusting the measured data to include only data corresponding to that remaining in the simulated data set after (iii), and computing a data residual, being a difference between the adjusted measured data and the simulated data set;

(f) adjusting the assumed physical properties model to reduce the data residual;

(g) repeating (b)-(f) until a predetermined convergence criterion is satisfied or other stopping condition is met; and (h) using an updated physical properties resulting from the adjusting of the assumed physical properties model in prospecting for hydrocarbons within the subsurface region, wherein the encoding in (b) and (d) is encoding each source and receiver with a different encoding function, wherein the encoding for each receiver is orthogonal or pseudo-orthogonal with respect to cross-correlation, and simulating some or all groups simultaneously in (d)(i), wherein the encoding is a function of frequency, wherein the source or group of sources is encoded with a set of bandpass filters, differing from each other in central frequency, phase, or both, and wherein the receivers are encoded with a set of notch filters, differing from each other in central frequency, phase, or both, and each of the notch filters is designed to notch out bandpass frequencies of the encoding functions corresponding to the source or group of sources for which that receiver was not active through a combination of corresponding ones of the bandpass filters and the notch filters.

16. The method of claim 15, wherein both the encoding in (b) and the encoding in (d) are accompanied by a second encoding, making the source gathers in (b) and the sources in (d) doubly encoded.

17. The method of claim 16, wherein the second encoding is +1/−1 encoding.

18. The method of claim 15, wherein the grouping strategy is to group a plurality of individual-source gathers having a common set of illuminated receivers.

* * * * *